United States Patent [19]
Harrison

[11] Patent Number: 5,228,010
[45] Date of Patent: Jul. 13, 1993

[54] SEISMIC ENERGY SOURCE AIR GUN
[75] Inventor: E. R. Harrison, Plano, Tex.
[73] Assignee: Halliburton Geophysical Services, Inc., Houston, Tex.
[21] Appl. No.: 723,137
[22] Filed: Jun. 28, 1991
[51] Int. Cl.[5] .......... G01V 1/04; G01V 1/38; H04R 23/00
[52] U.S. Cl. .................. 367/144; 181/120
[58] Field of Search ............... 367/143, 144; 181/120

[56] References Cited
U.S. PATENT DOCUMENTS

| | | | |
|---|---|---|---|
| 3,750,097 | 7/1973 | Havlik et al. | 367/144 |
| 4,484,657 | 11/1984 | Barta | 181/121 |
| 4,623,033 | 11/1986 | Harrison, Jr. | 367/144 |
| 4,753,316 | 6/1988 | Bouyoucos et al. | 181/120 |
| 4,779,245 | 10/1988 | Chelminski | 367/144 |
| 5,001,679 | 3/1991 | Harrison | 367/144 |
| 5,009,518 | 4/1991 | Tatum | 384/94 |

Primary Examiner—Ian J. Lobo
Attorney, Agent, or Firm—William J. Beard

[57] ABSTRACT

A shuttle air gun for generating an acoustic output for seismic testing having improved wear rings and seals is provided. The composition of the wear rings includes polytetrafluoroethylene. The composition of the seals includes polyester and Teflon oil. A vent assembly overlying a firing chamber vent check valve eclipsing an firing chamber vent is also provided. The vent assembly limits the movement of an O-ring check valve when compress air is vented from the firing chamber.

14 Claims, 2 Drawing Sheets

SEISMIC ENERGY SOURCE AIR GUN

FIELD OF THE INVENTION

This invention relates to a high pressure sleeve-type air gun for generating seismic energy in water and more particularly to a high pressure air gun employing improved wear rings and a firing chamber vent assembly.

BACKGROUND OF THE INVENTION

In marine seismic exploration, a source of acoustic energy is released into the water every few seconds to produce appropriate acoustic waves that propagate from the source into the earth's surface. These acoustic waves, upon contacting the marine floor and subfloor geologic formations, are reflected back to recording instruments having transducers which convert these waves into electrical signals which are then recorded. Analysis of these electronic signals provides insight into the structure of the subsurface geological formations.

There have been many devices utilized for generating these seismic or acoustic waves. Most recently, however, a major marine seismic energy source has been the air gun. (The term "air gun" is intended to encompass an apparatus for dispersing any suitable compressible gaseous fluid such as air, steam, nitrogen, carbon dioxide, gaseous products of combustion and so forth.) These air guns are capable of releasing high pressure air on the order of 2,000 psi to 6,000 psi in the water to create the desired acoustic waves.

The acoustic pulse generated by an air gun is proportional to the bubble velocity formed by the air escaping the air gun. As air exits the gun ports a bubble is formed. This bubble accelerates outwardly generating the acoustic pressure pulse which creates the seismic wave. As long as the air bubble/water interface is accelerating, the acoustic pulse amplitude is increasing. Once the maximum bubble velocity is reached, then the maximum acoustic pulse is achieved.

A typical air gun includes an annular housing having a primary chamber in which compressed air is stored and exhaust ports which allow the stored air to escape from the housing. These guns also include a constant source of compressed air through an inlet passage in the housing which supplies the compressed air for the primary chamber and which enters a control chamber to force the shuttle into a closed position over the exhaust ports in the housing. A solenoid valve is used to allow air to flow into a firing chamber opposite the control chamber having a shuttle bearing surface of greater surface are than the bearing surface in the control chamber. This creates unequal pressure on the shuttle, forcing the shuttle to an open position to expose the exhaust ports and allow the compressed air to escape into the surrounding water. When the shuttle is in a prefire or closed position, the air gun is charged and ready for firing. When fired, by activating the solenoid, the compressed air escapes into the water.

It is well known that by employing a plurality of air guns in an array the resulting pulse "signature" generated by the simultaneous firing thereof improves the high frequency response of such signature. However the timing repeatability, or in other words the ability to repetitively fire the air gun array such that the compressed gases from each air gun simultaneously accelerate outwardly from the opened shuttle, is paramount when air gun arrays are used. Because the seismic wave pulse is a narrow pulse with a sharp peak, any misalignment in the release of compressed gases from the air gun can degrade the pulse signature.

Generally, in the type of air gun describe above, timing repeatability is dependent on the gun pressure, shuttle mass, air flow passages, solenoid valve air flow, and friction between the shuttle and the wear rings and seals. Of these, shuttle friction between the moving shuttle and wear rings and seals is thought to have the greatest influence on the opening velocity of the shuttle.

Attempts at reducing friction between these components have included the placement of fluid lubricants between the moving surfaces. Lubricants placement is achieved by the injecting a lubricant into the high pressure air supply. However, the high oxygen concentration in the pressurized air supply and the presence of a lubricant therein creates a potentially explosive and hazardous condition.

Additionally, elastic O-ring check valves overlying vent openings have also been used in attempts to block debris, such as suspended inorganic material, slit, marine life and the like, from entering and fowling the air gun. For example in operation, as compressed gases in the firing chamber enter the firing chamber vent, the force exerted by the tensioned O-ring is overcome thus causing the O-ring to expand outwardly and away from the firing chamber vent opening allowing these gases to exhaust into the water. Substantially simultaneous with the venting of the firing chamber gases, a much larger volume of compressed gases stored in the primary chamber exits the air gun. During this time of multiple gas discharge, debris in the water may be forced passed the expanded O-ring into the air gun and may ultimately fowl shuttle movement.

Thus, safer and more reliable means for reducing friction between critical air gun components and preventing debris from entering and fowling shuttle movement is needed.

SUMMARY OF THE INVENTION

The present invention reduces shuttle friction by providing Teflon-based wear rings and polyester-based, O-ring-biased seals. The wear rings and seals of the present invention are positioned between the shuttle and the body of the air gun.

Additionally, the present invention includes a firing chamber vent shield assembly. The vent assembly is secured to the external surface of the shuttle and overlies a tensioned O-ring eclipsing the external firing chamber vent opening. In this way, as compressed gases entering the firing chamber vent port overcome the force exerted by the tensioned O-ring the outward expansion of the O-ring is limited during gas discharge.

DETAILED DESCRIPTION OF THE PREFERRED EMBODIMENT

Figure 1:
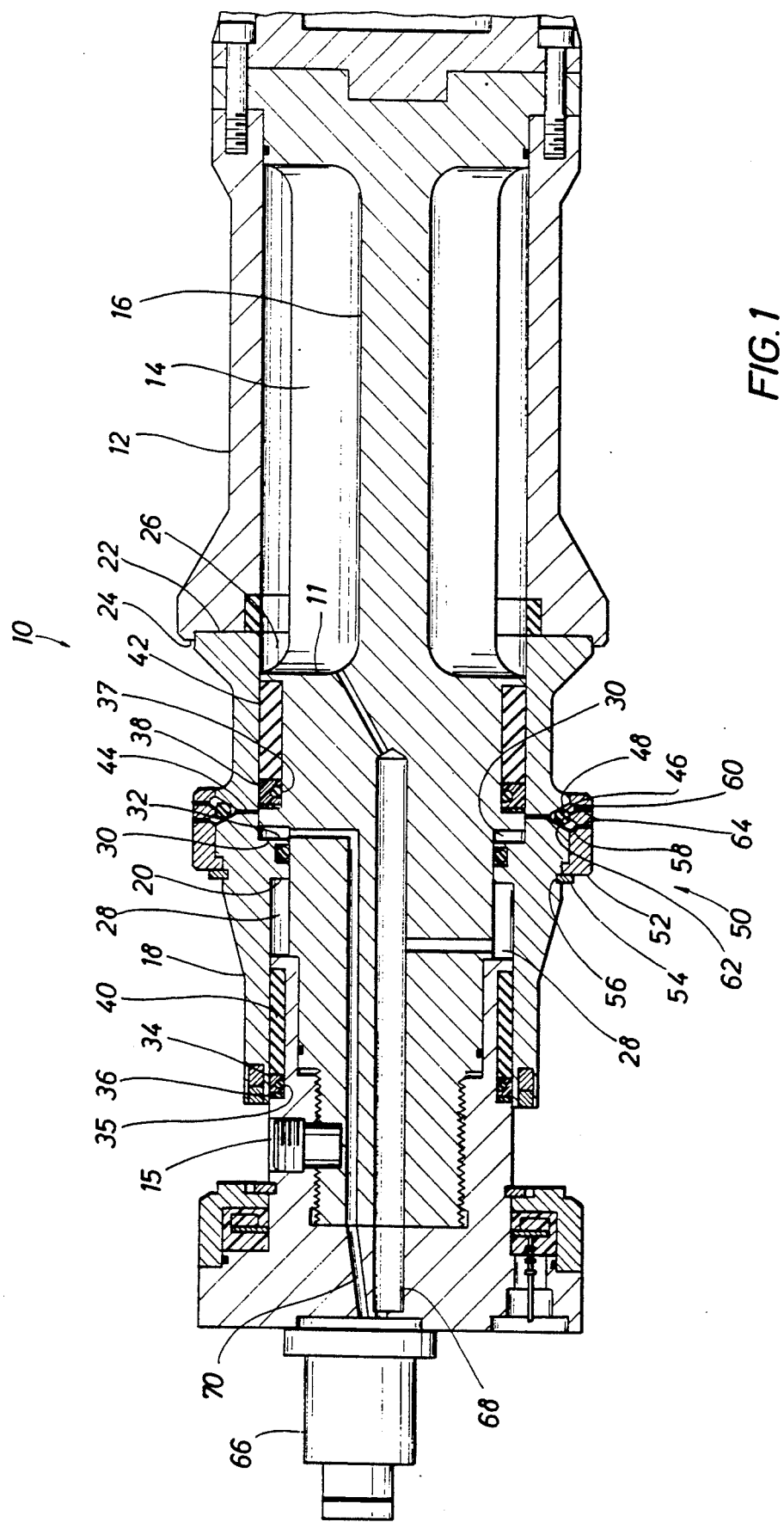
FIG. 1 is a vertical cross section of an air gun in accordance with the present invention.

Referring now to FIG. 1, therein is depicted an air gun 10 in accordance with the present invention. The air gun 10 includes a body 11 having an end cap 15 and a center post mandrel 16. The air gun 10 further includes a housing 12 cooperatively defining a generally annular primary chamber 14 around the center post mandrel 16. A sleeve shuttle 18 is concentric to housing 12 and includes an inwardly protruding lip 20 extending from approximately the mid portion of the sleeve shuttle 18 toward the center post mandrel 16. An end cap 15 is secured to the center post mandrel 16. The sleeve shuttle 18 has a shuttle face 22 at a first end, proximate a first end of housing 12. The housing 12 also includes a lip 24 which overlaps face 22 of the shuttle 18. The housing 12 and the mandrel 16 define an operable 360° port 26 communicating chamber 14 with the exterior of the air gun 10. The face 22 of shuttle 18 closes port 26 when the air gun 10 is in a prefired position.

An annular control chamber 28 is formed between the body 11, the shuttle 18, and the end cap 15, bounded also by lip 20. A firing chamber 30 is formed on the opposite side of lip 20 between the shuttle 18, the body 11 and a face 32. Seals 34, 36 and 38 are appropriately placed to seal between shuttle 18 and the body 11 to define chambers 28 and 30.

Seals 34 and 38, preferably U-shaped in vertical cross section and biased by O-rings 35 and 37 respectively. Seals 34 and 38 are made of a polyester-based composition, such as Hytrel, distributed by DUPONT. Teflon oil may also be blended during the manufacturing of seals 34 and 38. The seal 36 functions as a wiper ring and is preferable of the type manufactured by Parker Seal Company, and referred to as a Poly-Pak seal.

Wear rings 40 and 42 are positioned adjacent seals 34 and 38. Wear rings 40 and 42 are preferably cylindrical having a composition including polytetrafluoroethylene (Teflon) and more preferably including polytetrafluoroethylene and fillers and most preferably including polytetrafluoroethylene and at least one filler consisting of polyphenylene sulfide (Ryton). Wear rings 40 and 42 are products of Precision Fluorocarbon, Inc., Houston, Tex.

Figure 3:
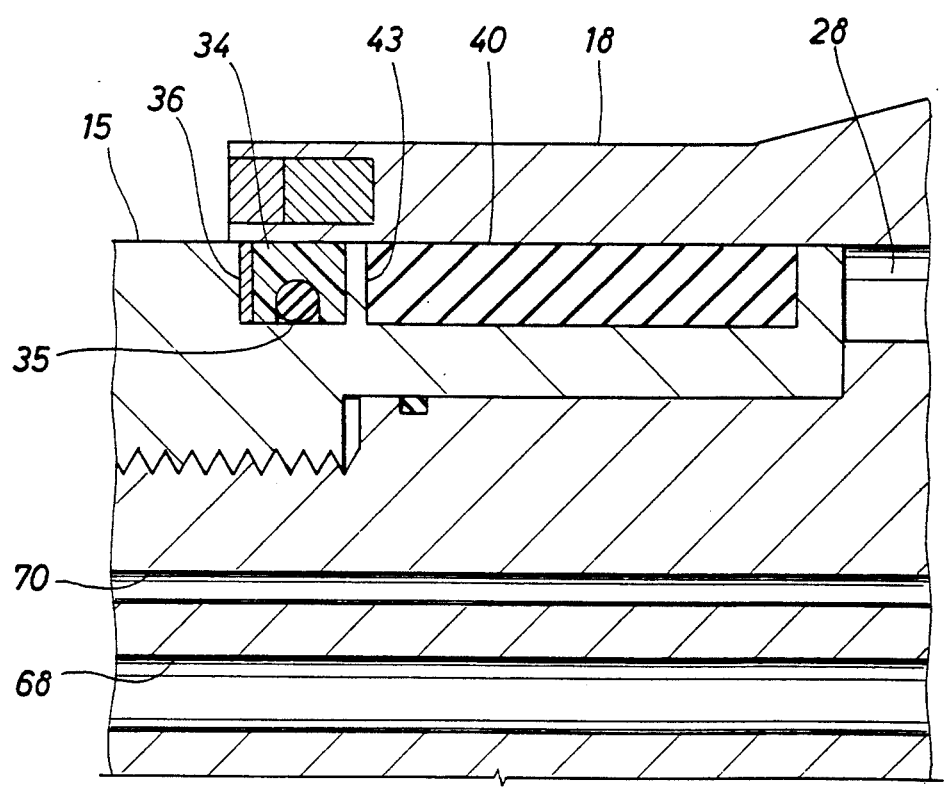
FIG. 3 is a partial fragmented view of FIG. 1 illustrating an alternate embodiment of the present invention.

FIG. 3, an alternate embodiment of the present invention, illustrates the wear ring 40 and the seal 34 separated by a shoulder 43. The shoulder 43 extends from the end cap 15 towards the shuttle 18 and is preferable machined for close fitting tolerance with the surface of shuttle 18 contacted by the seal 34. It will be understood that the ware ring 42 and the seal 38 may also be separated by a structure (not shown) similar to shoulder 43.

A vent 44 in the shuttle 18 vents the firing chamber 30. In the preferred embodiment a plurality of vents 44 ring the shuttle 18 and more preferably 12 such vents of between 0.030 to 0.125 inches in diameter are equally spaced about the shuttle 18. An O-ring check valve 46 overlying the outer opening of the vent 44 is tensioned about the outer surface of the shuttle 18 in an annular V-shaped groove 48.

Figure 2:
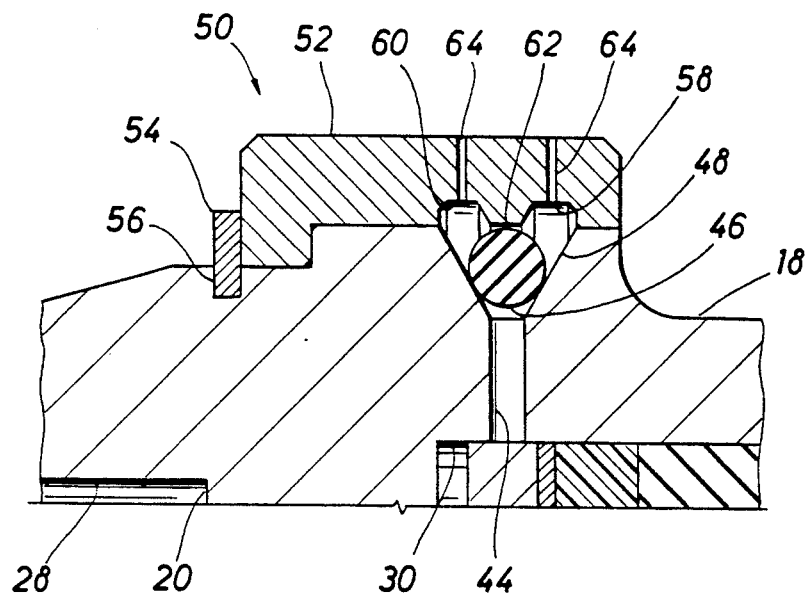
FIG. 2 is an enlarged view of a portion of the air gun of FIG. 1 illustrating the vent assembly.

As illustrated in FIGS. 1 and 2, a vent shield assembly 50 is secured to the outer surface of the shuttle 18 such that portions thereof overlie the O-ring 46 and the groove 48. The assembly 50 includes a collar 52 and a retaining ring 54, cooperating in an annular groove 56, for securing the collar 52 to the shuttle 18.

The collar 52 is provided with a pair of parallel groves 58 and 60 which are separated by a inwardly facing raised shoulder 62. A plurality of vents 64 extend from the base of groves 58 and 60 to the external surface of the collar 52. In the preferred embodiment about 22 to 28 vents (vent 64) of between 0.030 and 0.125 inches in diameter ring the collar 52. In the practice of the present invention, vertical alignment between vents 64 and vent 44 is not required.

The shoulder 62 is machined for centering alignment with the O-ring 46. In this way, upon firing the air gun and in response to the exhausting gases exiting vent 44, the travel of the O-ring 46 away from the shuttle 18 is limited while permitting the dissipation of these gases via vents 64. Preferably, in the prefired position the shoulder 62 and the O-ring 46 are separated by a distance of between 0.010 and 0.030 inches and preferably between 0.015 and 0.025 inches.

A solenoid 66 is shown attached to end cap 15. End cap 15 includes an air passages 68 and 70. The air passage 68 communicates with the control chamber 28 and the primary chamber 14. The air passage 70 communicates with the firing chamber 30.

In operation, the air gun 10 functions as follows: Pressurized source air enters both the control chamber 28 and the primary chamber 14 via the passageway 68. The pressure in control chamber 28 acts against the exposed surface formed by lip 20 in shuttle 18 forcing shuttle 18 to move until the shuttle face 22 sealing contacts housing 12 moving the shuttle 18 to the right as depicted in FIG. 1. Once the primary chamber 14 is fully pressurized, the air gun 10 is ready to fire.

The air gun 10 is fired by applying an electrical current to the solenoid valve 66 which allows source air to flow into the firing chamber 30 via the passageway 70. This pressure acts on the face 32 of the shuttle 18 providing a force urging the shuttle 18 against the force in chamber 28. Because the surface area of face 32 is larger than the exposed surface area of lip 20 within control chamber 28, a bias is created causing shuttle 18 to move in an opening direction (to the left, as depicted in FIG. 1). As the shuttle 18 moves away from the housing 12, the primary chamber air flows outward into the cavity formed between shuttle 18 and the lip 24. This opening force continues until the shuttle 18 clears the lip 24 at which time the primary chamber air starts to exhaust into the surrounding water through the 360° opening 26.

As the shuttle 18 moves to the left, the firing chamber 30 tends to exhaust air through the vent 44 pass the O-ring 46 as described above. When the solenoid 66 is deactivated, the pressure in passage way 70 is removed and the spring force in the control chamber 30 moves the shuttle 18 to the right, back to the prefire position.

Many modifications and variations may be made in the techniques and structures described and illustrated herein without departing from the spirit and scope of the present invention. Accordingly, the embodiments described and illustrated herein are illustrative only and are not intended as limitations upon the scope of the present invention.

What is claimed is:

1. An air gun responsive to a supply of compressed air comprising:
  a body;
  a housing assembly defining a primary chamber and a discharge port through which the primary chamber may be communicated with the environment surrounding the air gun;
  a valve means slidably mounted for opening and closing said discharge part and wherein portions of the valve means define a vent;
  a check valve secured to the valve means and aligned with the vent;

a firing chamber formed between the surfaces of the body and the valve means; and a vent assembly secured to the valve means for limiting the movement of the check valve when compressed air is vented from the firing chamber past the check valve and comprising a collar having a first portion thereof defining at least one vent and a second portion defining a shoulder for overlying the check valve.

2. The air gun of claim 1 wherein the check valve comprises an O-ring.

3. The air gun of claim 1 wherein said second portion is spaced a distance from the check valve.

4. The air gun of claim 1 wherein the valve means comprises a shuttle mounted to the body.

5. An air gun responsive to a supply of compressed air comprising:

portions of said air gun defining a vent;

a check valve secured to the air gun and aligned with the vent; and means for limiting movement of the check valve when compressed air is vented through the vent and past the check valve and including a vent assembly comprising a collar having a first portion defining at least one vent and a second portion defining a shoulder for overlying the check valve.

6. The air gun of claim 5 wherein the check valve comprises an O-ring.

7. The air gun of claim 5 wherein said second portion is spaced a distance from the check valve.

8. A seismic exploration method comprising:

generating an acoustic pulse in a body of water from an acoustic pulse source, wherein the acoustic pulse source is an air gun responsive to a supply of compressed air comprising:

portions of said air gun defining a vent;

a check valve secured to the air gun and aligned with the vent; and means for limiting the movement of the check valve when compressed air is vented through the vent and past the check valve, including a vent assembly comprising a collar having a first portion defining at least one vent and a second portion defining a shoulder for overlying the check valve.

9. The method of claim 8 wherein the check valve comprises an O-ring.

10. The air gun of claim 8 wherein said second portion is spaced a distance from the check valve.

11. A seismic exploration method comprising:

generating an acoustic pulse in a body of water from an acoustic pulse source, wherein the acoustic pulse source is an air gun responsive to a supply of compressed air comprising:

a body;

a housing assembly defining a primary chamber and a discharge port through which the primary chamber may be communicated with the environment surrounding the air gun;

a valve means slidably mounted for opening and closing said discharge port and wherein portions of the valve means define a vent;

a check valve secured to the valve means and aligned with the vent;

a firing chamber formed between the surfaces of the body and the valve means;

means for limiting the movement of the check valve when compressed air is vented from the firing chamber past the check valve including a collar having a first portion thereof defining at least one vent and a second portion defining a shoulder for overlying the check valve.

12. The method of claim 11 wherein the check valve comprises an O-ring.

13. The method of claim 11 wherein said second portion is spaced a distance from the check valve.

14. The method of claim 11 wherein the valve means comprises a shuttle mounted to the body.

* * * * *